United States Patent
Lin et al.

(10) Patent No.: US 7,151,547 B2
(45) Date of Patent: Dec. 19, 2006

(54) NON-RECTANGULAR IMAGE CROPPING METHODS AND SYSTEMS

(75) Inventors: Xiaofan Lin, Sunnyvale, CA (US); Hui Chao, San Jose, CA (US); Jian Fan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 69 days.

(21) Appl. No.: 10/995,683

(22) Filed: Nov. 23, 2004

(65) Prior Publication Data

US 2006/0109282 A1    May 25, 2006

(51) Int. Cl.
*G09G 5/00* (2006.01)
(52) U.S. Cl. .................. 345/627; 345/655
(58) Field of Classification Search .......... None
See application file for complete search history.

(56) References Cited

U.S. PATENT DOCUMENTS

| | | | | |
|---|---|---|---|---|
| 6,298,157 | B1 * | 10/2001 | Wilensky | 382/199 |
| 6,310,984 | B1 * | 10/2001 | Sansom-Wai et al. | 382/289 |
| 6,956,587 | B1 * | 10/2005 | Anson | 345/649 |
| 2002/0118891 | A1 * | 8/2002 | Rudd et al. | 382/282 |
| 2004/0201602 | A1 * | 10/2004 | Mody et al. | 345/700 |

OTHER PUBLICATIONS

Author: Spencer Judge (Sushisource) Title: Trend Art Style URL: http://www.kirupa.com/motiongraphics/trendart2.htm Publish Date: Jul. 19, 2004 Associated institution or organization: kirupa.com.*

* cited by examiner

*Primary Examiner*—Mark Zimmerman
*Assistant Examiner*—David Chu

(57) ABSTRACT

Systems and methods according to the present invention provide techniques to automatically crop an image to a desired size and non-rectangular crop shape. A non-rectangular crop shape can, for example, be input to an image processing system. The non-rectangular crop shape is then used to process the original image to generate the desired crop.

15 Claims, 6 Drawing Sheets

NON-RECTANGULAR IMAGE CROPPING METHODS AND SYSTEMS

BACKGROUND

The present invention relates generally to image processing systems and, more particularly, to methods and systems for automatically cropping an image.

Cropping an image refers to cutting away and discarding portions of the image. Cropping techniques evolved due to, among other things, challenges associated with precisely capturing a desired image using an image capture device, e.g., a camera. Photographic composition requires time and attention, which may not be available to a photographer in the act of capturing images of e.g., action events. Thus, after the fact, it may be desirable to change the focal point of the image by cropping the image. Today many images can be captured electronically and subsequently processed using image processing software. For example, many photo editing applications include a crop tool. Using the crop tool typically involves selecting the area to retain, refining the selection, and finalizing the crop action. Once the cropping procedure is finalized, the area outside the crop selection can be discarded.

Another area in which cropping can be used is in thumbnail generation. Thumbnails are small versions of original images which can be used, for example, in image retrieval or browsing systems. However, sometimes when an image is shrunk to create a corresponding thumbnail, it is no longer easily recognizable as representative of the original image. Accordingly, cropping can be used to reduce the size of an original image, prior to shrinking, in a way which captures important features of the original image and discards less important pixels.

Although cropping is typically performed manually, the growing reuse of objects and images in automated processes suggests that automated cropping is desirable. For example, automatic image cropping is one significant component of advanced Variable Data Printing (VDP) systems, which can personalize both the text and image contents based, e.g., on a user's preferences and demographic profile. For some applications, the copy hole 100 for the original image is rectangular so that the automatic image cropping function only needs to determine a rectangular-shaped cropping area as shown in FIG. 1(*a*). However, for other applications, e.g., professional publishing applications, the copy hole 120 can be non-rectangular, e.g., as shown in FIG. 1(*b*). Accordingly, it would be desirable to provide methods, devices and systems for automatically cropping images into resulting shapes that are non-rectangular.

SUMMARY

Systems and methods according to the present invention provide techniques to automatically crop an image to a desired size and desired non-rectangular shape. According to an exemplary embodiment of the present invention, a method for image processing includes the steps of inputting a non-rectangular crop shape and processing an original image to generate a cropped image, wherein the cropped image has the non-rectangular crop shape.

According to another exemplary embodiment of the present invention, an image processing system includes a processor which determines a non-rectangular crop shape and which processes an original image to generate a cropped image, wherein the cropped image has the non-rectangular crop shape.

BRIEF DESCRIPTION OF THE DRAWINGS

The accompanying drawings illustrate exemplary embodiments of the present invention, wherein:

FIG. 1(*b*) shows a document having non-rectangular copy hole which can be cropped using a non-rectangular crop shape;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 1A:
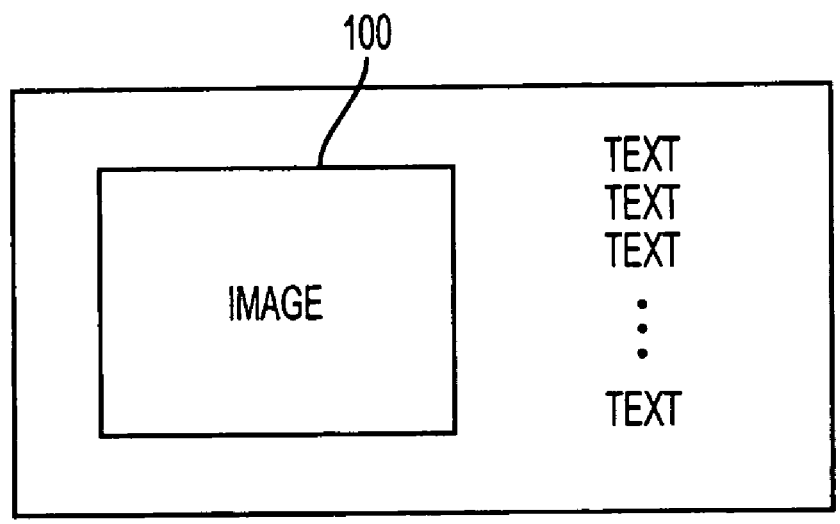
FIG. 1(*a*) shows a document having a rectangular copy hole which can be cropped using a rectangular crop shape.
Figure 1B:
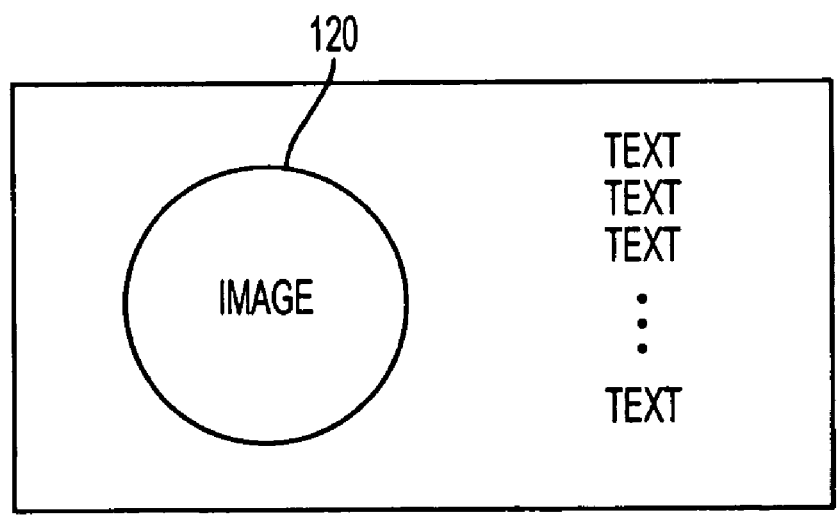
Figure 2:
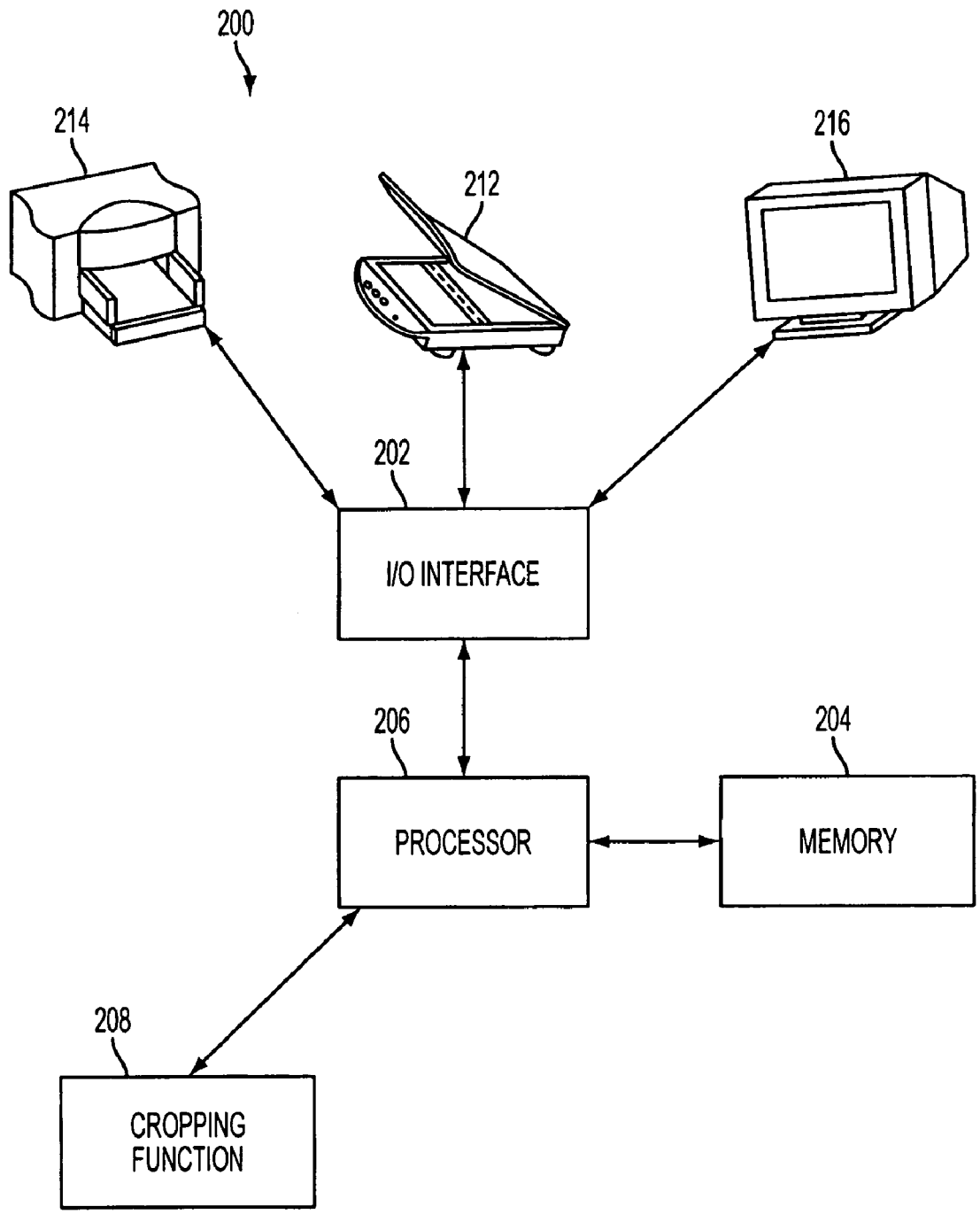
FIG. 2 depicts an image processing system according to an exemplary embodiment of the present invention.

In order to provide some context for this discussion, an image processing system according to an exemplary embodiment of the present invention will first be described with respect to FIG. 2. Therein, an image processing system 200 includes an I/O interface 202 and a memory device 204 that are connected to a processor 206. These components can be packaged together in, for example, a personal computer. The image processing system 200 further includes an automated cropping function 208 which is run by processor 206. Although the components 202–208 are illustrated in FIG. 2 as separate components of the image processing system 200, two or more of these components may be integrated, thereby decreasing the number of components included in the image enhancing system. Additionally, the component 208 may be implemented in any combination of hardware, firmware and software. According to one exemplary embodiment, component 208 can be implemented as a software program(s) that performs the functions of the component 208, as described below, when executed by the processor 206. Scanner 212 is connected via I/O interface 202 to capture images for processing by image processing system 200. The I/O interface may be a USB port, a serial port or any other interface port that is designed to interface the scanner 212 to the image processing system 200. Alternatively, the I/O interface 202 may be a network interface to receive digital images from a local network (not shown) or from the Internet (not shown). Additionally, other devices, e.g., a digital camera (not shown), may be connected via I/O interface 202 to capture images for processing by image processing system 200. Printer 214 and monitor 216 are connected to the image processing system 200 via I/O interface 202 to provide output devices for, e.g., the processed image data.

Figure 3:
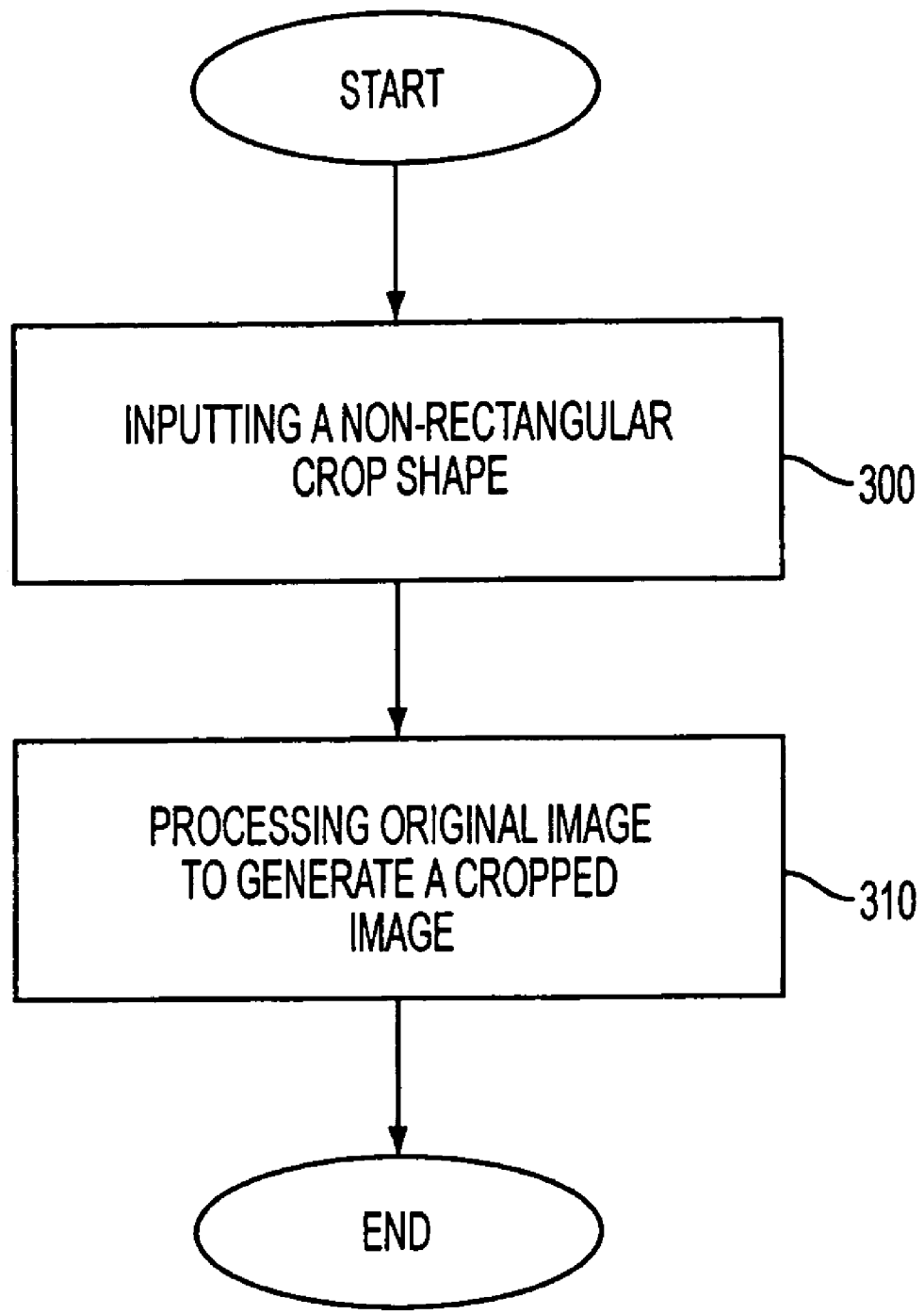
FIG. 3 is a flowchart depicting a method of cropping an image according to an exemplary embodiment of the present invention.

According to exemplary embodiments of the present invention, methods and systems are provided which operate to automatically crop an image to a desired size and non-rectangular shape. For example, as shown by the flowchart of FIG. 3, a general method for processing an image according to a generalized exemplary embodiment of the present invention includes the steps of: inputting a non-rectangular crop shape at step 300 and processing an original image to generate a cropped image at step 310, wherein the cropped image has the non-rectangular crop shape. According to one exemplary embodiment of the present invention, a non-rectangular crop shape can be generated using, as an intermediate step, a cropping function which generates rectangular-shaped cropped image.

Figure 4:
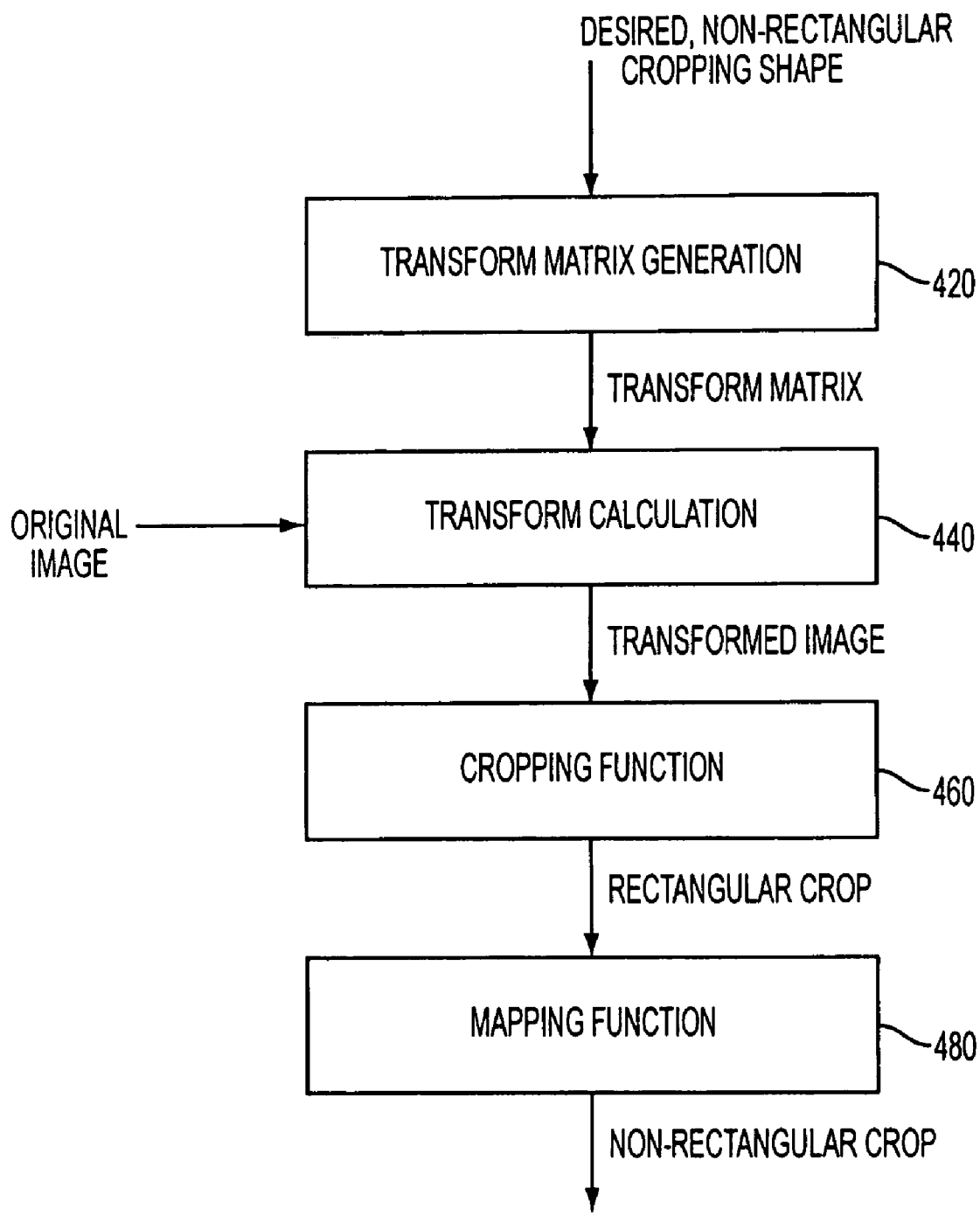
FIG. 4 is a flow diagram illustrating a technique for cropping an image to generate a non-rectangular crop according to an exemplary embodiment of the present invention.

An exemplary implementation of the method of FIG. 3 is depicted in the flow diagram of FIG. 4. Therein, a desired, non-rectangular crop shape is input to a transformation matrix function 420. In this exemplary embodiment of the present invention, the non-rectangular crop shape is a parallelogram and the transformation matrix function 420 calculates an affine transform matrix for the input parallelogram. Using an affine transform enables an upright rectangle in the transformed coordinate system to correspond to the desired parallelogram crop shape which, in turn, enables a cropping function that generates a rectangular-shaped, cropped image to be used to generate non-rectangular crops. A more detailed explanation regarding how the affine transform enables this relationship is provided below. Those skilled in the art will appreciate, however, that transformation matrix function 420 can be implemented using techniques other than affine transforms, e.g., depending upon the type of non-rectangular cropping shape to be used.

The transformation matrix function 420 outputs a transform matrix associated with the desired, non-rectangular crop shape. This transform matrix and the original image to be cropped are then input to transform calculation unit 440. The transform calculation unit 440 outputs a transformed image, e.g., an image transformed using an affine transform. According to this exemplary embodiment of the present invention, the original image is transformed based on the desired non-rectangular crop shape so that it can be cropped using a cropping function 460 which outputs a rectangular-shaped crop. The rectangular-shaped crop is then mapped back into the coordinate system of the original image using the mapping function 480. As described below, this mapping function 480 can be performed using an inverse of the transformation calculation performed by unit 440. The output of mapping function 480 is a non-rectangular crop of the original image.

Figure 5A:
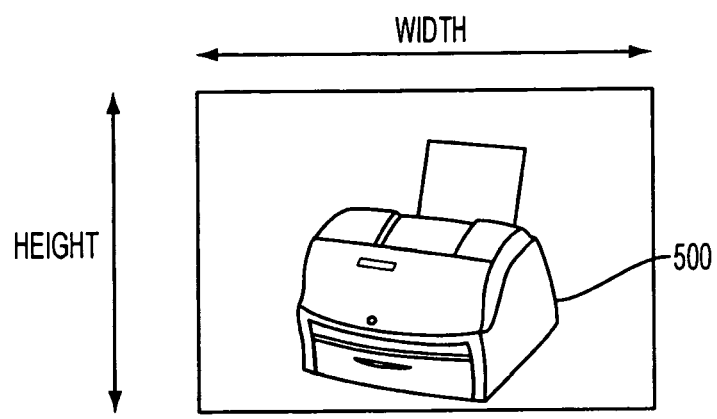
FIGS. 5(*a*)–5(*c*) illustrate an image in various stages of an image processing technique according to an exemplary embodiment of the present invention.
Figure 5B:
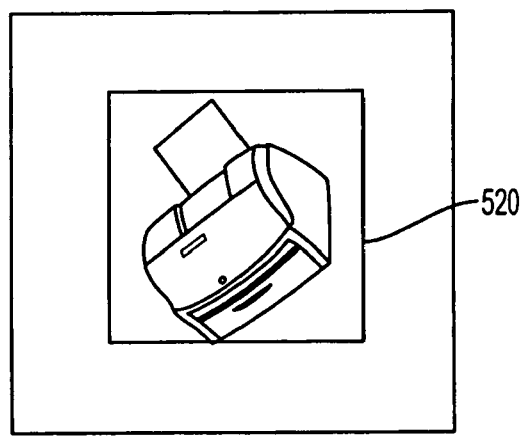
Figure 5C:
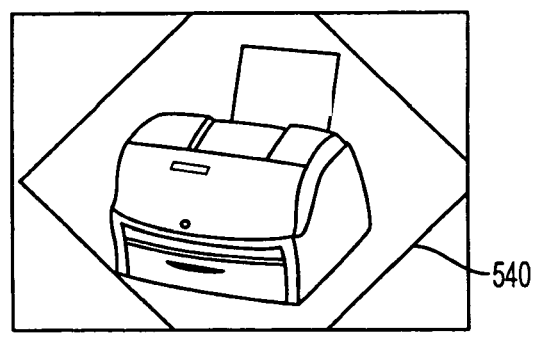

In order to better understand this process, consider FIGS. 5(*a*)–5(*c*) which depict an exemplary image in various stages of the image processing described above with respect to FIG. 4. Therein, FIG. 5(*a*) illustrates the original image of a printer 500 having a certain height and width as shown. FIG. 5(*b*) depicts the transformed image after, e.g., rotation, shearing and/or translation, by the transform calculation unit 440. Also shown in FIG. 5(*b*) is a bounding box 520 which indicates the rectangular crop which will be performed by cropping function 460. FIG. 5(*c*) depicts the image after it has been mapped back into its original coordinate system. Bounding box 540 indicates the non-rectangular crop which will result after the image is output from mapping function 480. Thus, it can be seen that by first transforming an original image based on the desired cropping shape, a cropping function which generates rectangular-shaped crops can also be used to generate non-rectangular shaped crops.

Figure 6:
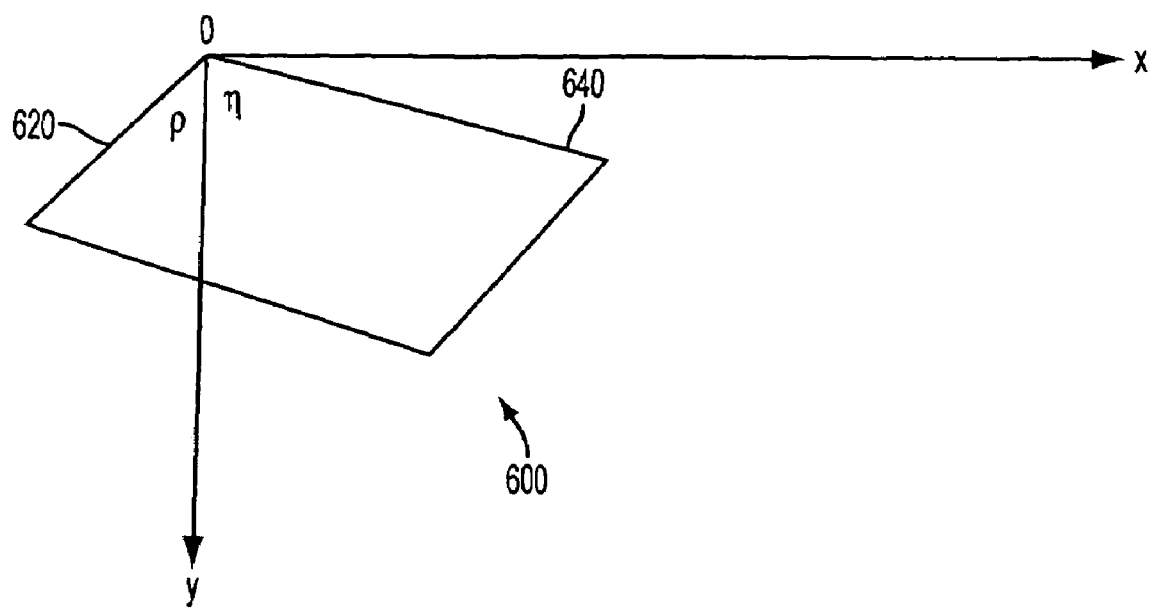
FIG. 6 shows a parallelogram as a desired cropping shape to be transformed according to an exemplary embodiment of the present invention.

Having provided an overview of exemplary embodiments of the present invention, some more details regarding exemplary techniques for the various steps will now be discussed. As mentioned above, a transform matrix is calculated by function 420 based on the desired non-rectangular crop shape which has been input. The type of transform to be performed is based on the particular non-rectangular, crop shape desired as an output. For an exemplary parallelogram crop shape, an affine transform can be used in functions 420 and 440. Consider the exemplary parallelogram 600 illustrated in FIG. 6. Therein a corner of the parallelogram 600 is placed at the origin of a pair of x-y axes as shown. The x-y axes represent the orientation of a regular rectangular crop of the original image and provide a reference for distorting the original image prior to cropping and mapping the cropped image back into its original frame of reference after cropping. To create an affine transform for the parallelogram 600, certain parameters of the parallelogram 600 are captured. For example, the ratio of the lengths of the two adjacent edges 620 and 640 of the parallelogram 600 is designated as m. The angle between the left edge 620 and the y-axis is designated as ρ, and the angle between the right edge 640 and the y-axis is designated as η. Using these parameters as exemplary, and the height and width of the original image referenced above, a two dimensional affine transform matrix X' can be calculated as:

$$X' = T(X) = \begin{bmatrix} a & b \\ c & d \end{bmatrix} X + \begin{bmatrix} x_0 \\ y_0 \end{bmatrix} \quad (1)$$

where:

$X$ is the matrix of original pixels $(x, y)$;

$X'$ is the matrix of transformed pixels $(x', y')$;

$T$ is a transform function;

$$\begin{bmatrix} a & b \\ c & d \end{bmatrix} = \begin{bmatrix} k\cos\theta & \sin\alpha \\ -k\sin\theta & \cos\alpha \end{bmatrix}$$

$$y_0 = \begin{cases} 0 (\text{otherwise}) \\ k\sin\theta * \text{width (if } \theta > 0) \end{cases}$$

$$x_0 = \begin{cases} 0 (\text{otherwise}) \\ -k\sin\alpha * \text{height (if } \alpha < 0) \end{cases}$$

and further where:

$$k = \sqrt{\frac{(p^2+1)q^2 + m^2(1+q^2)p^2}{p^2+1+m^2(1+q^2)}}, \ p = c\tan\eta, \ q = c\tan\rho$$

$$\theta = \sin^{-1}\left(mp\sqrt{\frac{1+q^2}{(p^2+1)q^2 + m^2(q^2+1)p^2}}\right),$$

$$\alpha = \sin^{-1}\left(\sqrt{\frac{1+p^2}{p^2+1+m^2(q^2+1)}}\right)$$

After the affine transform matrix is calculated for the desired crop shape (function 420), this matrix is then applied to the original image (function 440). First, a rectangular bounding box (Rect') is identified which is large enough to include all of the pixels in the original image. Then, for each pixel PIX' within Rect', the corresponding pixel PIX in the original image is identified using the inverse affine transform:

$$X = \begin{bmatrix} a & b \\ c & d \end{bmatrix}^{-1} \left( X' - \begin{bmatrix} x_0 \\ y_0 \end{bmatrix} \right) \quad (2)$$

Then the value of PIX identified by the inverse affine transform is assigned to PIX'. Some pixels in the new coordinate system will not be defined in the original image. When this occurs, a number of different techniques can be used to establish the value of PIX' for that pixel. For example, the value of an unknown pixel can be set to that of its border pixels, e.g., when the background color of the original image is undefined or not uniform, using the following equations:

$x$=min(max($x$,0), width−1)

$y$=min(max($y$,0), height−1) (3)

Alternatively, the values of unknown pixels can be set to predefined values, such as pure white or pure black, e.g., when the background color of the original image is known.

Once the original image has been transformed, then it can be cropped using a cropping function which generates a rectangular-shaped crop (function 460). Any such cropping function can be used, an example of which is described in U.S. patent application Ser. No. 10/863,963, entitled "Image Processing Systems and Methods", filed on Jun. 9, 2004, the disclosure of which is hereby incorporated by reference. As mentioned above, the output of the cropping function 460 is then mapped back into the coordinate system of the original image by mapping function 480. This can be accomplished by, for example, using the inverse matrix operation described above with respect to equation (2).

Systems and methods for cropping images according to the present invention can include a number of features in addition to those described above, as well as variations on those features. For example, the original image can be down-sampled prior to applying the transform and suitably scaled at the output to compensate for the down-sampling. This will reduce computation time associated with the transform steps. Likewise, it will be appreciated that techniques in accordance with the present invention can operate as pre- and post-processing associated with any automated cropping systems. Alternatively, the transforms described herein can be embedded within the cropping system which may improve accuracy by, for example, ignoring pixels in the transformed coordinate which are not defined in the original image.

Figure 7:
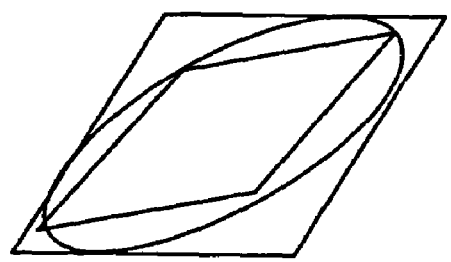
FIG. 7 shows parallelograms being used to approximate another desired crop shape according to an exemplary embodiment of the present invention.

The crop outputs according to exemplary embodiments of the present invention can provide for different parallelograms. In some variable data printing (VDP) applications, the copy holes can have other shapes, such as ovals and circles. In these cases, parallelograms can be used to approximate those shapes. For example, a diamond crop shape can enclose an oval copy hole or be enclosed in the oval copy hole as shown in FIG. 7. Alternatively, the diamond crop shape can be generated between the inner and outer diamonds shown in FIG. 7 to approximate the desired oval cropping shape. Since the internal angles of the parallelogram-shaped crops can be varied, such approximations will be more accurate than using only rectangular-shaped crops.

Additionally, as mentioned above, the present invention is not limited to generation of crops having a parallelogram shape or to the use of affine transforms. If, for example, the desired, non-rectangular crop shape is a circle, then a transformation matrix function 420 can be implemented using:

$$x' = \sqrt{x^2 + y^2}, \text{ when } x > 0, y > 0, x > y \quad (4)$$
$$y' = \sqrt{x^2 + y^2} * y/x$$

Similarly, other transformations can be created for other non-rectangular cropping shapes. One way of selecting an origin for image processing in accordance with this exemplary embodiment of the present invention is to first perform a rectangular autocrop procedure on the original image and to then use the center of the rectangular crop as the origin for the nonlinear transformation of equation (4).

Systems and methods for image processing according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. Various alternatives are also contemplated by exemplary embodiments of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for image processing comprising the steps of:
   inputting a non-rectangular crop shape; and
   processing an original image to generate a cropped image, by transforming said original image based on said non-rectangular crop shape to generate a transformed image; and cropping said transformed image to generate a cropped version of said transformed image, wherein said cropped image has said non-rectangular crop shape; and mapping said cropped version of said transformed image back into a coordinate system of said original image to generate said cropped image.

2. The method of claim 1, wherein said step of transforming further comprises the step of:
   using an affine transform to generate said transformed image as a function of said non-rectangular crop shape.

3. The method of claim 1, wherein said non-rectangular crop shape is a parallelogram.

4. The method of claim 1, wherein said cropped version of said transformed image has a rectangular shape.

5. A computer-readable medium containing a program that performs the steps of:
   inputting a non-rectangular crop shape; and processing an original image to generate a cropped image, by transforming said original image based on said non-rectangular crop shape to generate a transformed image; and cropping said transformed image to generate a cropped version of said transformed image, wherein said cropped image has said non-rectangular crop shape; and mapping said cropped version of said transformed image back into a coordinate system of said original image to generate said cropped image.

6. The computer-readable medium of claim 5, wherein said step of transforming further comprises the step of:

using an affine transform to generate said transformed image as a function of said non-rectangular crop shape.

7. The computer-readable medium of claim 5, wherein said non-rectangular crop shape is a parallelogram.

8. The computer-readable medium of claim 5, wherein said cropped version of said transformed image has a rectangular shape.

9. An image processing system comprising:

a processor which determines a non-rectangular crop shape and which processes an original image to generate a cropped image, wherein said cropped image has said non-rectangular crop shape, wherein said processor further performs the processing steps of transforming said original image based on said non-rectangular crop shape to generate a transformed image and crops said transformed image to generate a cropped version of said transformed image; and wherein said processor maps said cropped version of said transformed image back into a coordinate system of said original image to generate said cropped image.

10. The image processing system of claim 9, wherein said processor transforms said original image using an affine transform to generate said transformed image as a function of said non-rectangular crop shape.

11. The image processing system of claim 9, wherein said non-rectangular crop shape is a parallelogram.

12. The image processing system of claim 9, wherein said cropped version of said transformed image has a rectangular shape.

13. The image processing system of claim 9, wherein said processor determines said non-rectangular crop shape by receiving said non-rectangular crop shape as a user input.

14. An image processing system comprising:

means for determining a non-rectangular crop shape; and means for processing an original image to generate a cropped image, by transforming said original image based on said non-rectangular crop shape to generate a transformed image; and cropping said transformed image to generate a cropped version of said transformed image, wherein said cropped image has said non-rectangular crop shape; and means for mapping said cropped version of said transformed image back into a coordinate system of said original image to generate said cropped image.

15. A method for image processing comprising the steps of:

inputting a non-rectangular crop shape; and processing an original image to generate a cropped image by mathematically transforming said original image from a first coordinate system into a second coordinate system to generate a transformed image, cropping said transformed image and mapping said cropped, transformed image back into said first coordinate system, wherein said cropped image has said non-rectangular crop shape.

* * * * *